United States Patent
She et al.

(10) Patent No.: US 7,133,922 B1
(45) Date of Patent: Nov. 7, 2006

(54) METHOD AND APPARATUS FOR STREAMING OF DATA

(75) Inventors: James Pei-Man She, New Territories (HK); Danny Hin-Kwok Tsang, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 324 days.

(21) Appl. No.: 09/634,947

(22) Filed: Aug. 7, 2000

(51) Int. Cl.
G06F 15/13 (2006.01)

(52) U.S. Cl. ............... 709/231; 709/232; 370/231; 370/390; 370/466

(58) Field of Classification Search ............. 709/231, 709/217, 224, 200, 223, 232, 203; 725/87; 370/231, 390, 466
See application file for complete search history.

(56) References Cited

U.S. PATENT DOCUMENTS

| | | | |
|---|---|---|---|
| 5,752,246 A * | 5/1998 | Rogers et al. .......... 707/10 |
| 5,793,964 A * | 8/1998 | Rogers et al. .......... 709/202 |
| 5,928,331 A * | 7/1999 | Bushmitch .......... 709/231 |
| 5,930,473 A * | 7/1999 | Teng et al. .......... 709/204 |
| 5,956,391 A * | 9/1999 | Melen et al. .......... 379/114.01 |
| 5,970,491 A * | 10/1999 | Schreiber et al. .......... 707/10 |
| 6,006,264 A * | 12/1999 | Colby et al. .......... 709/226 |
| 6,023,722 A * | 2/2000 | Colyer .......... 709/201 |
| 6,061,722 A * | 5/2000 | Lipa et al. .......... 709/224 |
| 6,070,191 A * | 5/2000 | Narendran et al. .......... 709/226 |
| 6,091,951 A * | 7/2000 | Sturniolo et al. .......... 455/432.2 |
| 6,104,695 A * | 8/2000 | Wesley et al. .......... 370/216 |
| 6,128,279 A * | 10/2000 | O'Neil et al. .......... 370/229 |
| 6,128,653 A * | 10/2000 | del Val et al. .......... 709/219 |
| 6,167,438 A * | 12/2000 | Yates et al. .......... 709/216 |
| 6,181,697 B1 * | 1/2001 | Nurenberg et al. .......... 370/390 |
| 6,189,039 B1 * | 2/2001 | Harvey et al. .......... 709/232 |
| 6,259,701 B1 * | 7/2001 | Shur et al. .......... 370/401 |
| 6,262,982 B1 * | 7/2001 | Donahue et al. .......... 370/352 |
| 6,324,182 B1 * | 11/2001 | Burns et al. .......... 370/429 |
| 6,331,983 B1 * | 12/2001 | Haggerty et al. .......... 370/400 |
| 6,332,157 B1 * | 12/2001 | Mighdoll et al. .......... 709/217 |
| 6,377,991 B1 * | 4/2002 | Smith et al. .......... 709/226 |
| 6,385,647 B1 * | 5/2002 | Willis et al. .......... 709/217 |
| 6,405,256 B1 * | 6/2002 | Lin et al. .......... 709/231 |
| 6,418,138 B1 * | 7/2002 | Cerf et al. .......... 370/352 |
| 6,421,706 B1 * | 7/2002 | McNeill et al. .......... 709/204 |
| 6,434,608 B1 * | 8/2002 | Desai .......... 709/217 |
| 6,434,622 B1 * | 8/2002 | Monteiro et al. .......... 709/231 |

(Continued)

OTHER PUBLICATIONS

Epstein, Steve, Using Multi-protocol encapsulation technology to develop optimum data broadcast systems, IEE pp. 1-7.*

(Continued)

*Primary Examiner*—Krisna Lim
(74) *Attorney, Agent, or Firm*—Buchanan Ingersoll & Rooney PC (57) ABSTRACT

A method and apparatus for providing streaming data to multiple clients involves the provision of intelligent gateway at the edge of a network. The gateway is designed so that if it receives a request from a second client within the network for a data stream already being supplied to a first client in the network, that data stream is duplicated by the gateway rather than making a second request for the same stream from a server. Multiple such gateways can be combined to form a large load balancing network. An important aspect of the invention is a software interface in the gateway that enables a data packet address type to be changed from unicast to multicast and vice versa.

20 Claims, 8 Drawing Sheets

U.S. PATENT DOCUMENTS

| | | | |
|---|---|---|---|
| 6,446,109 B1* | 9/2002 | Gupta | 709/203 |
| 6,510,469 B1* | 1/2003 | Starnes et al. | 709/247 |
| 6,523,069 B1* | 2/2003 | Luczycki et al. | 709/249 |
| 2001/0054065 A1* | 12/2001 | Garg | 709/203 |

OTHER PUBLICATIONS

Wu et al., Optimization of downstream delivery on a CATV network, 1996, IEEE, pp. 1138-1142.*

* cited by examiner

(a) With multicast, sender transmits only a single copy of a packet regardless of the number of receivers (b) Without multicast, sender transmits as many copies of every packet as the number of receivers

METHOD AND APPARATUS FOR STREAMING OF DATA

FIELD OF THE INVENTION

This invention relates to a method and apparatus for the streaming of data, and in particular to such a method and apparatus that permits multiple users to receive such streaming data with the minimum necessary increase in bandwidth. The invention is particularly useful for the streaming of live video and/or audio data but is not limited thereto.

BACKGROUND TO THE INVENTION

Streaming is a method of data transfer in which a client requests a server to send data at a certain speed. Although data streaming can be used for file transfers, it is particularly useful for the transfer of audio and/or video data.

Live broadcasts of video and/or audio material over the Internet are becoming increasingly popular and common. Such material may include the output of radio and television stations, or video or audio transmissions of one-off events such as concerts, fashion shows and sporting events. In this context, however, the term "broadcast" is in fact used loosely and inaccurately. What in reality happens is that a person wishing to receive such material will make a request to the appropriate website server and a point-to-point connection is made between the server and the source of the request.

The audio and/or video data is then transmitted from the server to the recipient via the point-to-point connection using streaming technology. Streaming is a just-in-time technology that allows the server to transmit to the recipient audio and video data with only a small cache of data being stored in the memory of the recipients computer. A number of streaming technologies are known, including the industry standard real-time streaming protocol (RTSP) and a number of proprietary products such as RealPlayer, Microsoft Windows Media Player, and Apple QuickTime.

PRIOR ART

Figure 1:
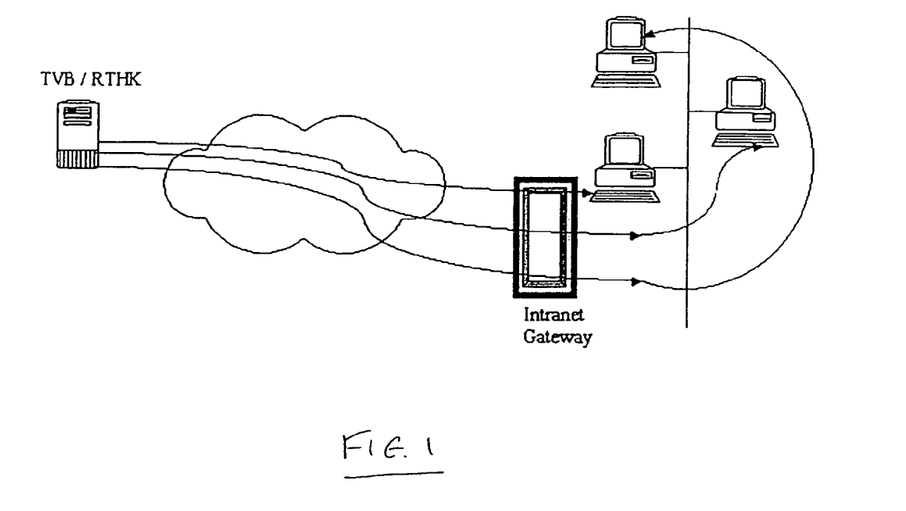
FIG. 1 is a schematic view illustrating a conventional streaming approach.

A disadvantage with conventional streaming technology can be seen from a consideration of FIG. 1 which illustrates a conventional point-to-point streaming approach. In particular, current streaming techniques use a point-to-point approach that does not scale well with increasing numbers of users. For example, as shown in FIG. 1, if multiple users wish to receive the same live event, a separate point-to-point connection is made between the server and each recipient, even if (as in the example of FIG. 1) the users are all within the same Intranet gateway and receive the same live data. Large amounts of identical data must be transmitted from the server to each individual recipient.

This is very inefficient and wasteful of bandwidth, and if the server and recipients are located far apart, it is particularly wasteful of international bandwidth which is expensive. Current technologies are also very demanding of the server which must serve each recipient independently. These drawbacks make the Internet "broadcasting" of popular events very difficult, and if an event is popular the load on the Internet can be substantial, causing delays that at best downgrade the quality of the transmission and in severe cases can cause the overload and collapse of the server.

Figure 2:
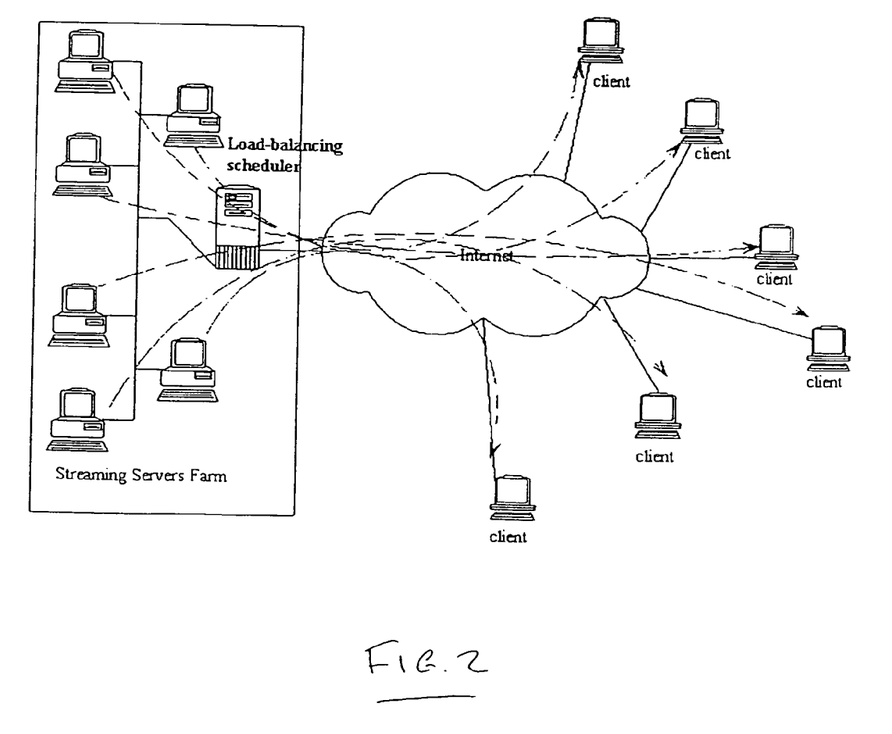
FIG. 2 illustrates the concept of a video farm.

One proposed solution to such problems is to establish a "video farm" by creating a cluster of media servers and load-balancing services. The concept of a video farm is shown schematically in FIG. 2. A main disadvantage of this scheme, however, is that it is hard to predict how popular a streaming live broadcast will be, and it is hard to estimate the size and power of the video farm that would be required to support the audience.

Figure 3:
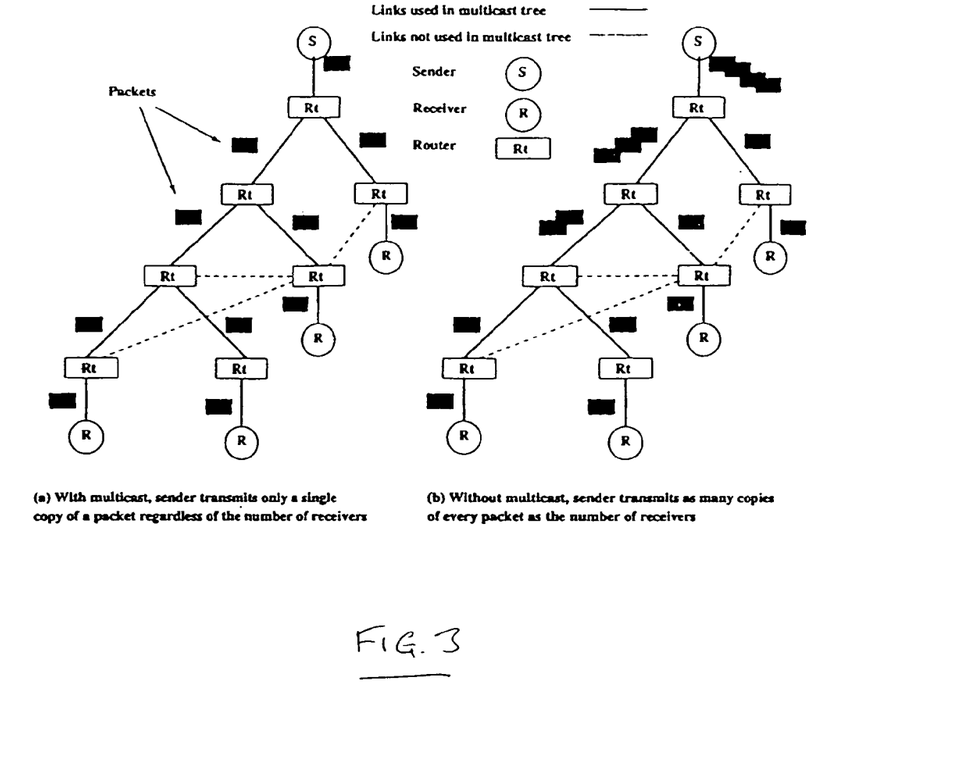

Multicasting has been proposed as a general solution for network overload. Multicasting enables one copy of digital information, such as a video stream, to be received by multiple users. With multicast technology a sender sends only a single copy of a packet regardless of how many users wish to receive it. The single copy of the packet travels as far in the network as it can until it reaches a fork at which a second copy must be made, and so on. This is illustrated in FIGS. 3(a) and (b) which show multicast and point-to-point unicast transmissions respectively. Multicast is a one-way one-to-many technology in which the server only needs to send out one stream of data to a group address (known as a Class D IP address) regardless of the number of users.

Multicast transmission, however, has a number of problems that have prevented it from being widely used. These include operational barriers such as problems being hard to diagnose and fix, the absence of control of who sends and who receives, no routing or traffic policies, and no end-to-end content management.

One method of minimising bandwidth problems with static (ie non-live) Internet transmissions is the concept of a proxy or cache located at the edge of a group of users or an Intranet. A cache stores details of webpages requested by members of the group, and when a second or further member of the group requests the same page, instead of routing the request to the original server, the cache will function as a proxy server and supply the page from its own memory store. This is a useful technique when multiple users may wish to view the same webpages (for example a newspaper website) though users have to be aware that they may not be seeing the most up to date version of that page. This technique cannot, however, be applied to live transmissions.

SUMMARY OF THE INVENTION

According to the present invention there is provided apparatus for providing streaming data from a server to multiple clients comprising, a gateway located between said server and said clients, wherein said gateway includes:
 (a) means for obtaining streaming data from said server upon receipt of a first request for a stream from any of said clients, and
 (b) means for providing said stream from said gateway to second and subsequent clients requesting said stream.

By means of this arrangement, it is no longer necessary for a separate point-to-point unicast connection to be made between the server and each client, but instead if a gateway is already supplying one client with a data stream, the gateway can also supply further clients with the same data stream without having to go back to the server.

In a preferred embodiment of the invention the gateway comprises means for maintaining a list of all streams currently being supplied to clients of the gateway, and means for comparing a request from a client for a stream with the list, the stream being obtained from the server if the requested stream is not on the list and the stream; being supplied to the client from the gateway if the requested stream is on the list.

A preferred way of implementing the invention is for the gateway to include software interface means for changing the address type of the data packets of a stream, whereby when it is desired to supply a stream to a client, the data packets input to the gateway are switched to a multicast address type for supply to all the clients of the gateway that are requesting the stream. Preferably means are provided for duplicating said data packets to be supplied to multiple clients by providing a logical multicast loop back, and wherein the time-to-live (TTL) is set to zero. After duplication of the data packets, a second software interface may be provided that changes the address type of the duplicated data packets from multicast back to unicast prior to output to the clients if the clients are in a unicast network, and to a multicast address for a group of clients located in a multicast enabled network.

While the invention as described above provides significant advantages in preventing the need for every different client to have a streaming connection to a server, loading problems may still occur in a network if multiple gateways request the same streaming content from a server. To overcome this problem, a network of gateways may be provided that can share and balance the streaming load.

Viewed from another aspect therefore the present invention provides apparatus for providing streaming data from a server to multiple clients, comprising a plurality of gateways located between said server and said clients, each said client being associated with one said gateway, wherein each said gateway is provided with means for sourcing a data stream from a server or another gateway upon receipt of a first request for a said stream, and means for supplying a second or subsequent client with a data stream already being supplied to a first client, and wherein each said gateway is provided with means for deciding upon receipt of a request from a client for a data stream whether said gateway can supply the data stream itself and, if not, for deciding whether a neighbouring gateway exists from which said data stream may be obtained.

Preferably each gateway includes: a list of all neighbouring gateways, a database listing all the data streams currently being supplied by the neighbouring gateways, and a database of all the streams being supplied by the said gateway. In order for this database to be updated, preferably each gateway reports to each neighbouring gateway when it starts to supply a new data stream. In order to provide load balancing, each said gateway may be provided with means for selecting between two or more possible gateways as the source of a data stream requested by a client. The selecting means preferably selects from all possible source gateways firstly by eliminating overloaded or maximum loaded sources and then on the basis of quality of the streams that can be supplied by the possible source gateways, the loading of the possible source gateways, and the communication latency between the possible source gateways and the requesting gateway. Preferably therefore each gateway is provided with means for interrogating a possible source gateway as to stream quality, loading and communication latency.

In a preferred embodiment, to provide optimum results, after eliminating overloaded or maximum loaded sources, the quality of the streams provided by the possible source gateways is the first criteria in selecting a source gateway, the source gateway loading is the second criteria to be used in the event of equal stream quality, and the communication latency is the final criteria if stream quality and source gateway loading are all equal.

Viewed from another broad aspect the present invention provides a method of providing streaming data from a server to multiple clients comprising, locating a gateway between said server and said clients, obtaining streaming data from said server upon receipt of a first request for a stream from any of said clients, and providing said stream from said gateway to second and subsequent clients requesting said stream.

Viewed from a still further broad aspect the present invention provides a method for providing streaming data from a server to multiple clients, comprising locating a plurality of gateways between said server and said clients, each said client being associated with one said gateway, sourcing a data stream from a server or another gateway in the event that a request for a stream is a first request to a said gateway for a said stream, and supplying a data stream from the said gateway to a second or subsequent client requesting a data stream in the event that said second or subsequent client is requesting a data stream already being supplied to a first client.

Another important aspect of the present invention is the novel software application interface and therefore viewed from yet a further aspect of the present invention there is provided a software interface application in an object-oriented environment comprising means for changing an address type of a data packet from (a) unicast to multicast, or (b) multicast to unicast, or (c) a first multicast address to a second multicast address, or (d) a first unicast address to a second unicast address.

Viewed from a yet further aspect of the present invention there is provided a data transmission network comprising a plurality of network domains wherein some of said network domains are unicast domains and the remainder of said domains are multicast domains, said network further comprising a plurality of gateways located at the boundaries and said gateways at least at the boundaries between a unicast domain and a multicast domain being provided with software interface means for changing the address type of a data packet from unicast to multicast or vice versa.

BRIEF DESCRIPTION OF THE DRAWINGS

Some embodiments of the invention will now be described by way of example and with reference to the accompanying drawings, in which:

FIGS. 3(a) and (b) illustrate the concept of multicasting,

DETAILED DESCRIPTION OF PREFERRED EMBODIMENTS

Figure 4:
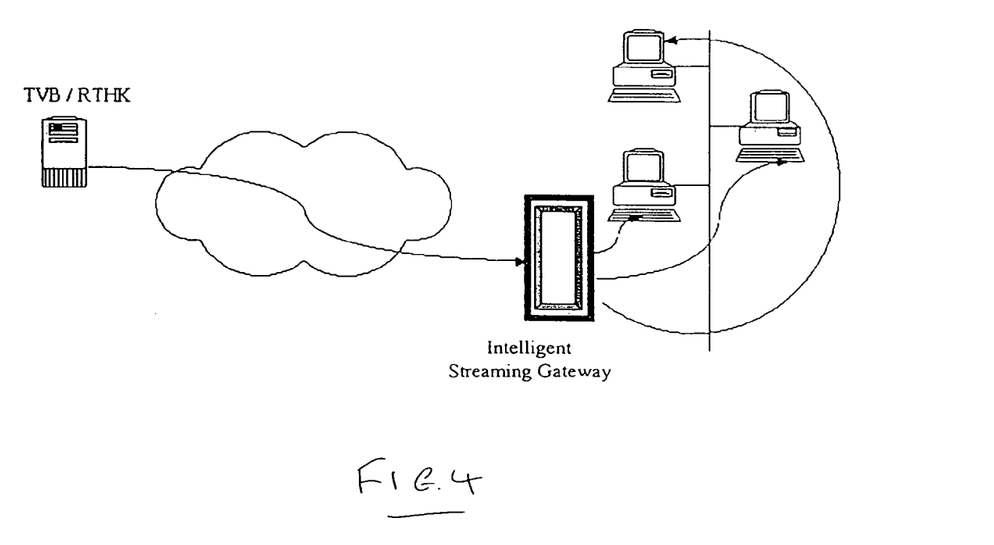
FIG. 4 is a schematic view of an embodiment of the invention.

Referring firstly to FIG. 4 there is shown in general terms the basic structure of the present invention. The present invention is based on the idea of providing an intelligent gateway at the edge of a group of users (such as an Intranet) through which requests for streaming data and the resulting data streams all pass. As will be described in more detail below, when a second or further user within the group requests streaming data from a server that is already being supplied through the gateway to a first user within the group, the gateway recognises that one user is already receiving the streaming data. Instead of passing the request from the second user to the server, the gateway supplies the second user with a copy of the data stream that is passing to the first user. This means that there is only a single stream of data passing from the server to the gateway, and that multiple streams are only required within the group or Intranet where a wide bandwidth is more readily available.

Figure 5:
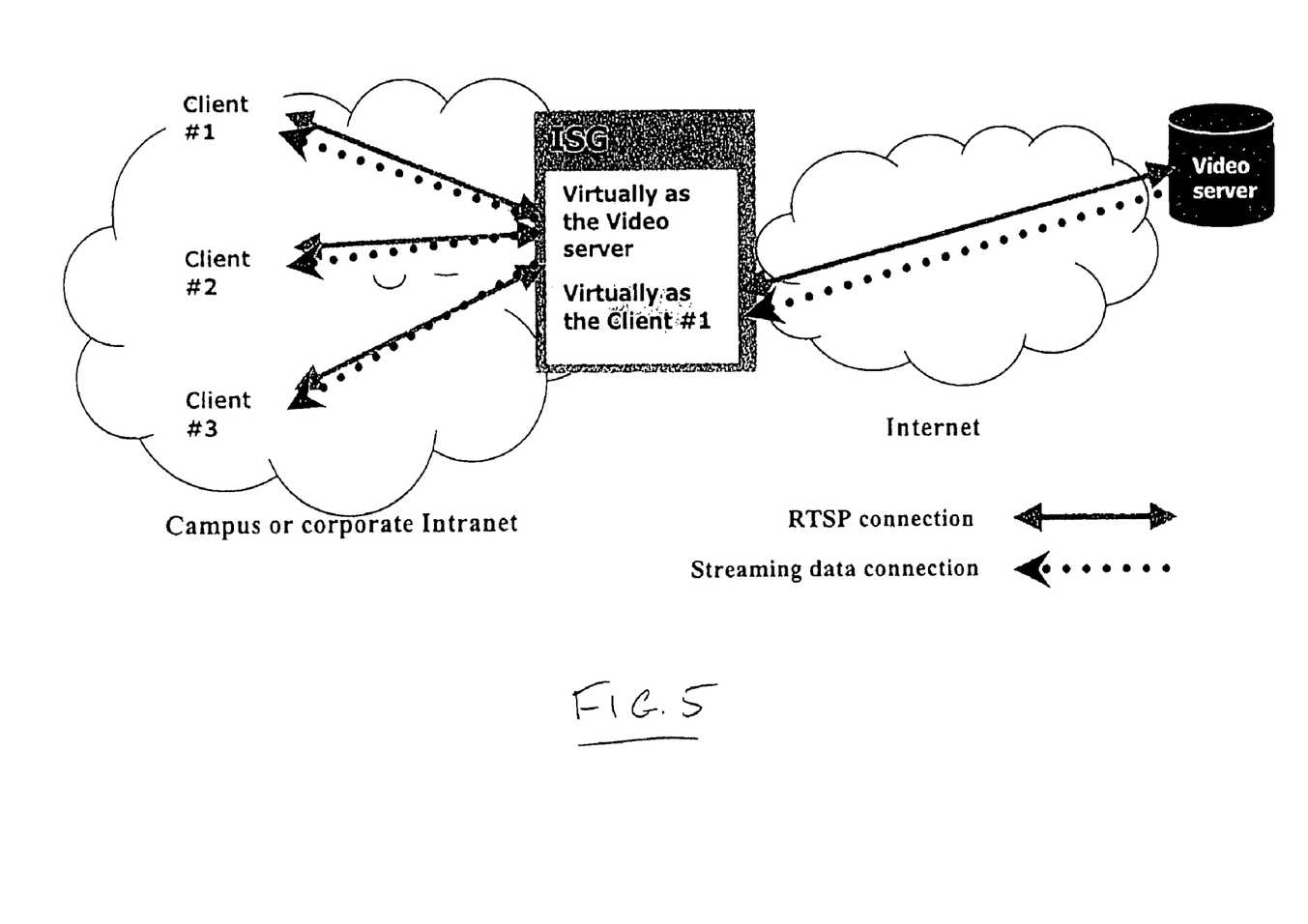
FIG. 5 illustrates the concept of a virtual server and a virtual client.

To achieve this design, it is necessary for the gateway to appear to the second and further users within a group as a virtual server, such that these users think they are connected to the server, while at the same time the actual server sees the gateway as a virtual client, whereas in fact the actual clients are the users within the group controlled by the gateway. This concept of the gateway being simultaneously a virtual server and a virtual client is illustrated in FIG. 5.

In an exemplary embodiment of the invention, this may be achieved using RTSP commands as will be seen in the following. It should be understood, however, that RTSP is used here as an example only, and the invention may equally be applied to other forms of streaming protocols. Before describing the invention in more detail, however, a brief discussion of RTSP may be helpful, though a complete understanding of RTSP would be readily familiar to a skilled reader.

RTSP is a communication protocol for the control and delivery of real-time streaming media. There are a number of standard RTSP message formats. The general syntax for an RTSP message is:

{message name} {URL} {protocol version} CRLF

{parameters}

An example of such a RTSP message may be:

DESCRIBE rtsp://live.example.com.concert/audio RTSP/1.0

Cseq: 321

Accpet: application/sdp, application/mheg

This message is a request for a RTSP server to send a description of the media content, rtsp://live.example.com.concert/audio, using either Session Description Protocol (SDP) or Multimedia and Hypermedia Experts Group (MHEG) formats.

Each RTSP request is followed by a response message. The general form of a response message is:

{protocol version} {status code}){reason-phrase] CRLF

{parameters]

A typical response message may therefore be:

RTSP/1.0 200 OK

Cseq: 321

In general terms, an RTSP server can use any type of packet format for sending media data to an RTSP client as RTSP is session-oriented. The packet format used to send media data is of little interest to intermediary network devices since all necessary network port information is contained in the RTSP messages. RTSP can therefore support different packet formats such as Standard Real Time Transport Protocol (RTP), and proprietary data transport protocols. The data packets can be transported using multicast user datagram protocol (UDP), unicast UDP, or inline TCP (data interleaved with the RTSP control stream).

Turning to the embodiment of FIG. 5, to begin with a first user (C1) within a group may request a particular video or audio stream from a server (S) via the gateway (ISG). This request may appear as follows in RTSP terminology:

```
C1 → ISG → S    DESCRIBE rtsp://live.example.com/concert/audio
                RTSP/1.0 Cseq: 1
```

This request is then acknowledged by the server to the client through the gateway

```
S → ISG → C1    RTSP/1.0 200 OK
                Content-type: application/sdp
                Content-length: 44
                . . . media format description . . .
```

The client will then issue to the server a SETUP command to the server and will indicate the port to which the streaming data is to be sent:

```
C1 → ISG → S    SETUP rtsp://live.example.com/concert/audio RTSP/
                1.0 Cseq: 2
                Transport: RTP/AVP/UDP; unicast;
                client_port=6970–6971;
                mode=play
```

This will be confirmed by the server which will also allocate an identifying session number:

```
S → ISG → C1    RTSP/1.0 200 OK
                Transport: RTP/AVP/UDP; unicast;
                client_port=6970–6971:
                mode=play
                Cseq: 2
                Session: 048831
```

Transmissions of the streaming data may now commence and the client will issue a play command to the server via the gateway:

```
C1 → ISG → S    PLAY rtsp://live.example.com/concert/audio RTSP/1.0
                Cseq: 3
                Session: 048831
```

The server will then commence the transmission of the streaming data to the client via the gateway:

| | |
|---|---|
| S → ISG → C1 | RTSP/1.0 200 OK |
| | Cseq: 3 |
| | Session: 048831 |

In this dialogue, the gateway carries out the build-up of the corresponding databases as well as routing messages between the client and the server and to route through the gateway the resulting streaming data. Because the command messages from the first client are forwarded to the server via the gateway, to the server the gateway appears as a client.

However, when a second client (C2) requests the same streaming data from the server (S), it will be seen from the following that the role of the gateway (ISG) changes. In this situation the second client makes the same request as the first client, but the gateway checks a memory store of all data streams currently passing through the gateway and if it finds that the data stream requested by the second client is already being supplied to the first client, the gateway takes over the functions of the server which never in fact sees the command messages of the second client. It will be noted in the following that the same command messages are sent between the second client and the gateway as are sent between the first client and the server via the gateway, thus to the second client the gateway appears as a server:

| | |
|---|---|
| C2 → ISG | DESCRIBE rtsp://live.example.com/concert/audio RTSP/1.0 |
| | Cseq: 1 |
| ISG → C2 | RTSP/1.0 200 OK |
| | Content-type: application/sdp |
| | Content-length: 44 |
| | . . . media format description . . . |
| C2 → ISG | SETUP rstp://live.example.com/concert/audio RTSP/1.0 |
| | CSeq: 2 |
| | Transport: RTP/AVP/UDP; unicast; client_port=6990–6991; mode=play |
| ISG → C2 | RTSP/1.0 200 OK |
| | Transport: RTP/AVP/UDP; unicast; client_port=6990–6991; mode=play |
| | CSeq: 2 |
| | Session: 048831 |
| C2 → ISG | PLAY rtsp://live.example.com/concert/audio RTSP/1.0 |
| | CSeq: 3 |
| | Session: 048831 |
| ISG → C2 | RTSP/1.0 200 OK |
| | CSeq: 3 |
| | Session: 048831 |

Figure 6:
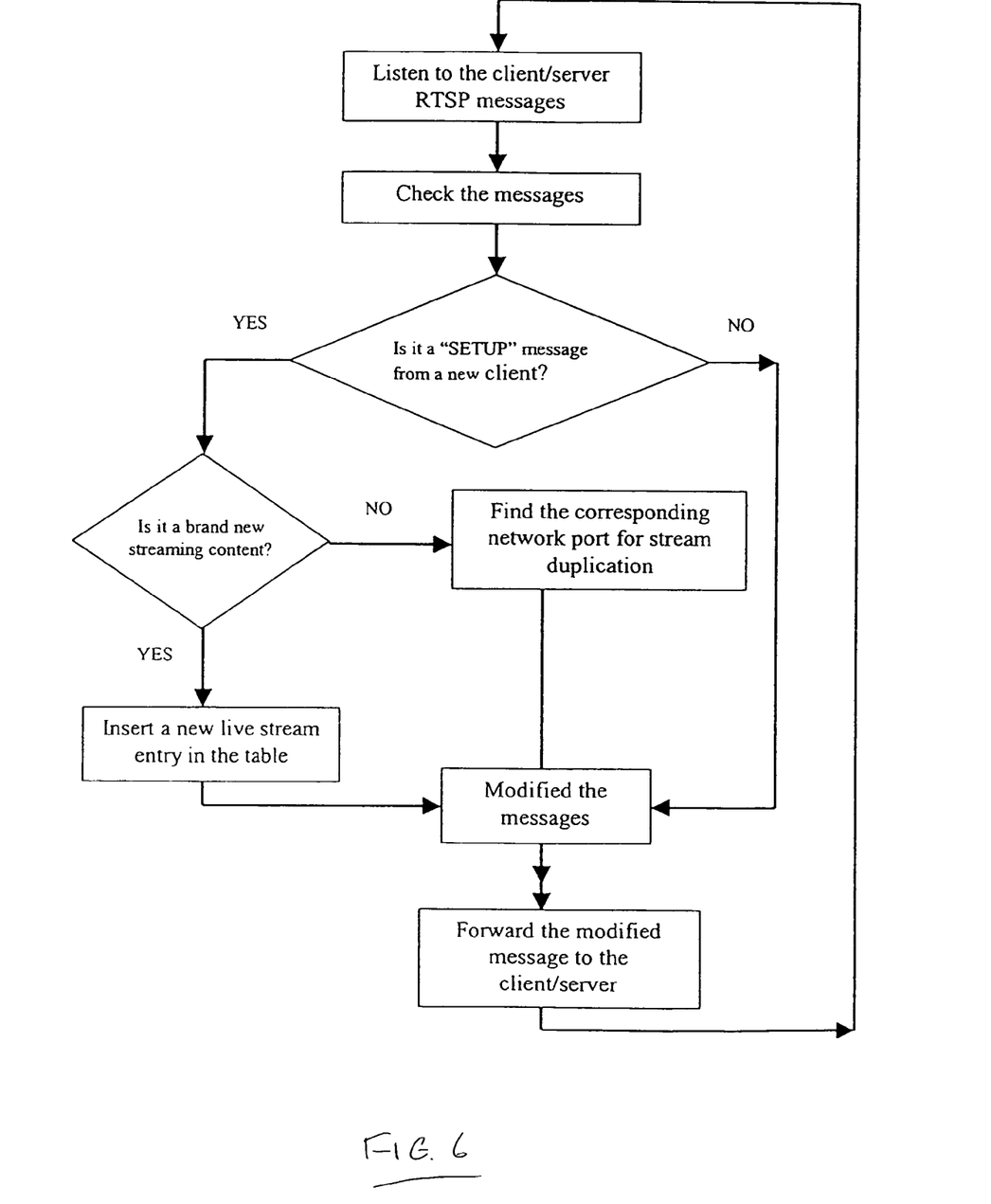
FIG. 6 is a flowchart illustrating the operation of the gateway upon receipt of a message from a client.

FIG. 6 is a schematic flowchart showing how the ISG functions in this embodiment of the invention. The ISG listens to streaming messages and requests from its clients and from servers, and in particular listens for requests from a new client. If the message is from a new client the ISG determines whether or not the request is for an existing stream. If not, ie if the request is for a new stream, then an entry is inserted into a table that lists all streams currently being supplied and the request is modified and sent on to the server. If the request is for a stream already entered in the table, ie a stream already being supplied to another client of the ISG, then that stream is located and supplied additionally to the new client in a manner to be described below and the ISG serves as a proxy server.

To implement this algorithm, the ISG may be provided with means for copying the data packets of a stream for which a second or subsequent request has been received, and then for directing the thus copied packets to the second or subsequent client. However, this becomes very burdensome on the processing power of the ISG, especially as the number of clients to be served starts to increase substantially. In practical terms, such a method faces major scalability problems. More preferably therefore, the ISG is provided with means for changing the transport modes of the data packets being transmitted from the server to the client as will be explained below.

In a preferred embodiment of the invention this is achieved by the use of a novel application programming interface (API)—similar to a Berkeley socket—which is an interface object class in an object oriented programming environment. This novel API comprises the following objects and data: a class of input socket, a class of output socket, operation methods, and additional data or buffer. In the present example, however, the only operation method that is used is that a data packet received from the input socket will be sent out immediately through the output socket.

It will be appreciated that by combining different input and output sockets, four major types of the API can be developed: (a) unicast to multicast (u-to-m) in which an input unicast data packet is output as a multicast packet to a group of users; (b) multicast to multicast (m-to-m) in which an input packet from one group of users may be output as a multicast packet to another group of users; (c) multicast to unicast (m-to-u) in which an input from one group of users is output as a unicast packet to one user; and (d) unicast to unicast (u-to-u) in which an input unicast packet is output as a unicast packet.

Such APIs may be used to implement the present invention, and in particular to provide the required duplication of data streams within the ISG without encountering scalability problems regardless of the number of clients wishing to receive a particular data stream as will now be described. In particular, data packets received by the ISG from a server are unicast data packets. If the ISG determines that these data packets are required by multiple clients who wish to receive the same data stream a first API in u-to-m form is used to change the address of the packets to a unique multicast Class D address that corresponds to the clients who wish to receive the data. The value of Time-To-Live (TTL) is set to zero to avoid the duplicated data packet leaving the ISG and flooding the network served by the ISG. Unicast packets received by a u-to-m API are duplicated by immediately looping the packets back by a logical multicast loop.

At the same time, a group of second APIs are provided each providing an output to a respective client and each of the second APIs being in m-to-u form if the clients are located in a unicast network. These second APIs listen for data packets with the Class D address assigned by the first API and then transmit any such data packets as unicast packets to their respective clients. It should be noted here that an API in a m-to-u form is used where the clients are located in a unicast network domain, but if the clients are located in a multicast network domain a m-to-m API may be used in which the multicast address of the output packets corresponds to the client group.

Figure 7:
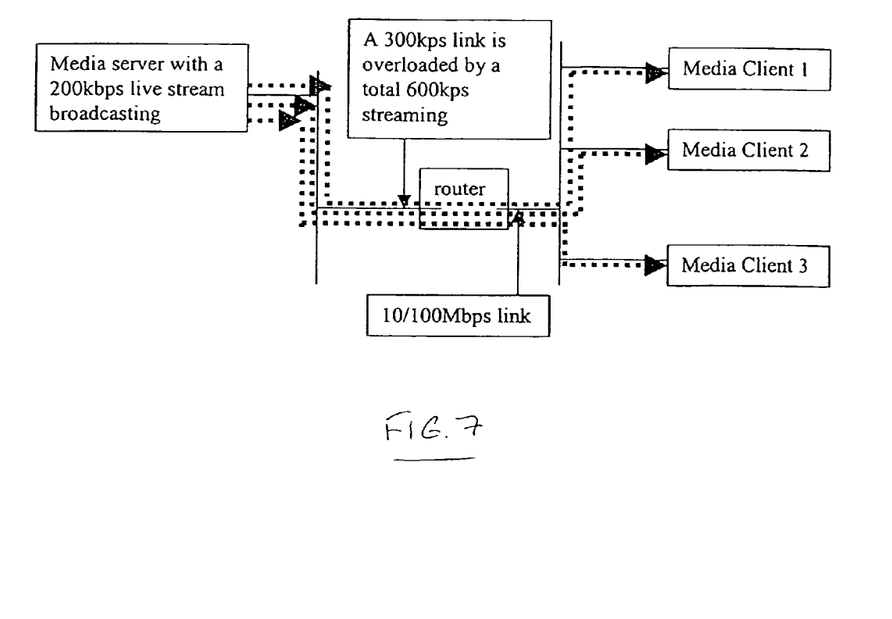
FIG. 7 is a block diagram of a conventional method of streaming data to multiple clients.
Figure 8:
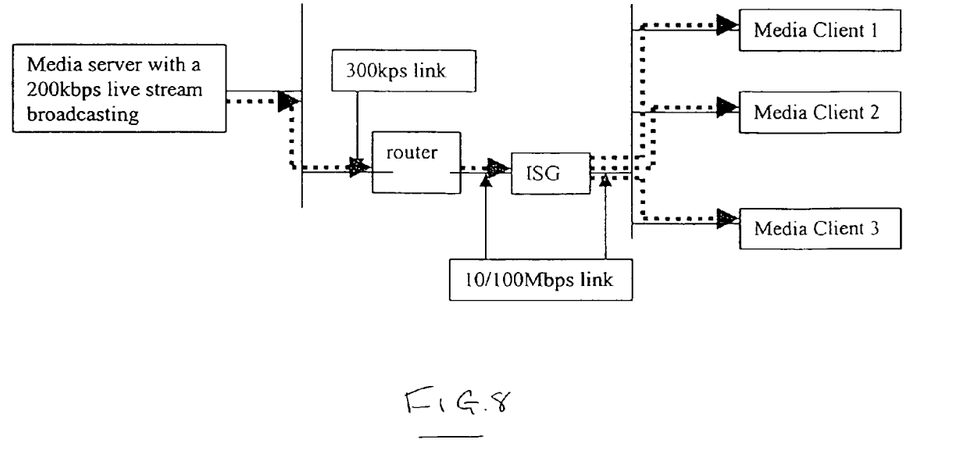
FIG. 8 is a block diagram illustrating an example of the invention for comparision with FIG. 7.

FIGS. 7 and 8 illustrate an example of the invention (FIG. 8) in comparison with a conventional arrangement (FIG. 7) both of which have been constructed and implemented.

In the conventional arrangement of FIG. 7, perfectly acceptable results were obtained with one only client. About 200 kbps of bandwidth were consumed at both interfaces of the user. With a second client, however, 400 kbps is required at the input interface to the user which exceeds the normal 300 kbps bandwidth available and the quality of the streaming data starts to deteriorate at both clients. Naturally this problem becomes even more serious with 3 or more clients.

FIG. 8 shows an example of the invention in which an ISG is positioned between the router and the clients. Two different ISGs were tested, one using an Intel Pentium III 500 MHZ with 128 Mb Ram, the other using an Intel Pentium 90 Mhz and 32 Mb RAM. The first of these examples was able to support 200 clients each receiving the same 200 kbps data streams simultaneously, even the less powerful second example was still able to support 20 clients.

Figure 9:
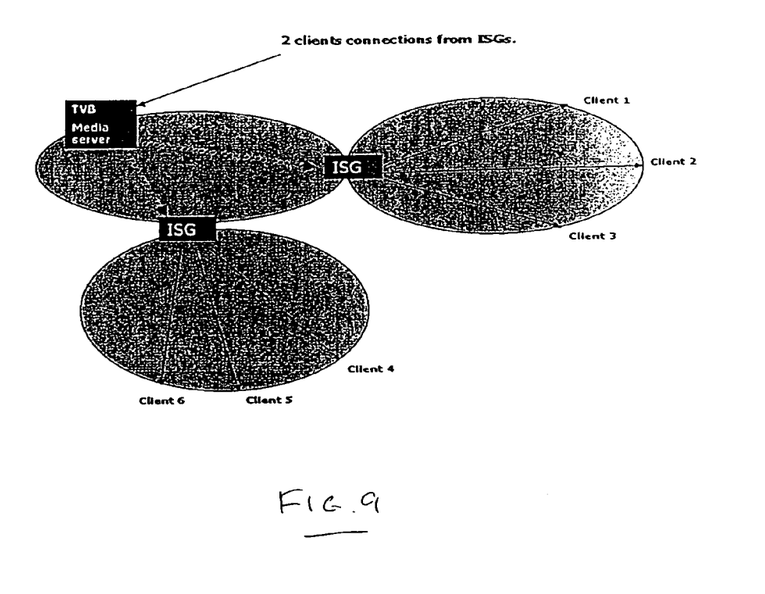
FIG. 9 illustrates two gateways linked to one server.

Although the use of an ISG in accordance with an embodiment of the present invention is capable of reducing the bandwidth requirement by needing only a single stream from the server to the ISG in order to be able to serve all clients within the ambit of the ISG, for very popular streaming transmissions bandwidth and scalability problems can still occur when multiple ISGs, each serving different groups of clients, each makes requests to a server for a data stream in order to meet the requests of clients within the groups served by the ISGs. This situation is illustrated in FIG. 9. While FIG. 9 shows the server serving only two ISGs—a situation which might be quite acceptable—problems with bandwidth (and especially international bandwidth) may once again occur when large numbers of ISGs make the same request.

A further embodiment of the invention results from the observation that since an ISG appears to its clients as a proxy server, an ISG can also act as a proxy server to another ISG. An ISG is therefore not obliged to obtain the data stream directly from the server, but could obtain the data stream from another ISG. In a preferred embodiment of the invention, therefore, a distributed dynamic load-balancing protocol may be developed in which an ISG does not necessarily obtain the data stream but may instead obtain the data stream from another ISG, the choice of whether to request the server or another ISG (and in that case, which ISG) being dependent on the loading of the server and the ISGs as will be described below.

In this embodiment of the invention, when an ISG is added to a network, a list of all neighbouring ISGs is included in the ISG with the IP addresses of each ISG. This information may be entered manually during a set-up procedure. Each ISG also establishes an availability database that indicates which data streams are already available from which ISGs. Such a database may be of the following form:

ISG, and in particular to the Class D multicast address given to each stream by the u-to-m API in the ISG that is handling the stream. For example, this database may appear as:

| Content URL | Multicast address |
| --- | --- |
| rtsp://live.example.com/concert/audio.rm | 225.3.2.1 |
| rtsp://live.example.com/concert/video.rm | 225.3.2.3 |
| — | — |

A connection counter also keeps track of the total number of streams passing through an ISG at any time.

These databases located in each ISG are constantly updated by all the other neighbouring ISGs by means of a report protocol as follows. When each ISG receives the first packet of a particular streaming content, it informs all neighbouring ISGs with a REPORT message giving the URL address of the content, and the IP address of the ISG. The REPORT message is in the format "REPORT URL, IP", where URL is the absolute RTSP URL address of the streaming content, and IP is the IP address of the ISG generating the report message. When a REPORT message is received by a neighbouring ISG, the information of the content address and the ISG that is receiving that content is entered into the availability database with the IP address being added as a further possible source for that content.

The availability database allows an ISG to know from where it may be able to obtain a streaming content when a request is received from one of the clients of that ISG for a data stream that is not already being handled by that ISG. However, for the load balancing protocol of this embodiment to be implemented, an algorithm must be devised to enable an ISG to make a decision on which source of a streaming content the ISG should use. Three factors are used in this algorithm.

1. The loading ratio of an ISG which is defined as the number of existing connections/the maximum number of possible connections.
2. A quality index representing the quality of any streaming content being received by an ISG. This is the ratio of the actual bit rate observed to expected bit rate of a particular streaming content.
3. The communication latency between two ISGs.

These factors are used because it is less desirable for one ISG to source streaming content from another ISG if that

| Content URL | Possible Source 1 | Possible Source 2 | Possible Source 3 |
| --- | --- | --- | --- |
| rtsp://live.example.com/concert/audio.rm | 143.89.14.111 | | |
| rtsp://live.example.com/concert/video.rm | 143.89.14.101 | 143.89.14.231 | |
| — | — | — | — |

In this example it will be seen that for rtsp://live.example.com/concert/audio.rm there is only one possible source (in addition to the server) for that stream, which is an ISG having the location 143.89.14.111. For data stream rtsp://live.example.com/concert/video.rm there are two possible sources, the ISGs with addresses 143.89.14.101 and 143.89.14.231.

A further database keeps track of the connections corresponding to the various data streams passing through an ISG is already heavily loaded, or if the quality of the streaming data being handled by that ISG is poor, or if there is high communication latency between the two ISGs.

Figure 10:
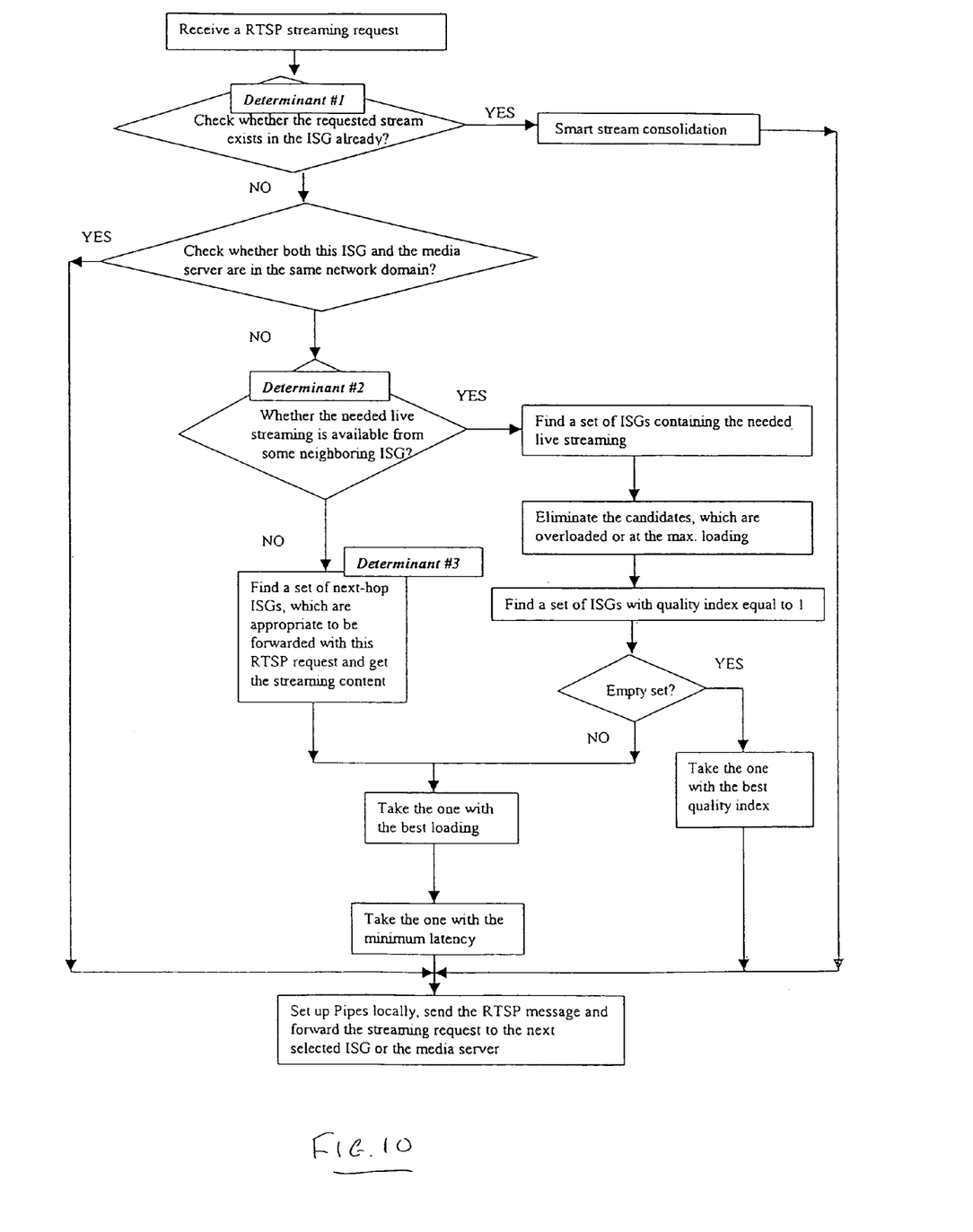
FIG. 10 is a flowchart showing how a network of gateways can function to balance network load.

Each ISG sends a QUERY message to each neighbouring ISG to query the value of these factors in the form QUERY URL and an ISG receiving such a query replies immediately with the values of the three factors 1 to 3 listed above with the query reply QUERYRET URL, load, quality, latency and the results are used as the basis of the decision of from where should an ISG source a streaming content using the algorithm illustrated in the flowchart of FIG. 10.

As shown in FIG. 10, when an ISG receives a request for streaming content, the first step is to determine whether that streaming content exists within the ISG. If it does, then of course the ISG simply adds the new client to the group receiving the streaming content in the manner described above. If not, the ISG determines whether the streaming content server is in fact in the same network domain as the ISG. If the answer to this is yes, then the ISG can simply obtain the streaming content directly from the server. If the answer is no, however, then the ISG checks the availability database to determine whether the stream is available from any neighbouring ISG. If it is, then the ISG makes a request from the possible sources by eliminating sources that are already overloaded, finding an ISG with a quality index of 1 (or the nearest to 1), and there are more than one neighbouring ISGs with a quality index of 1, the one with the best loading is chosen, and the minimum latency is used to further differentiate between possible sources if necessary.

If no neighbouring ISG has the streaming content, then the first ISG repeats the search but through ISGs one step removed until a suitable source is found. If no suitable source is found, the first ISG can request the streaming content directly from the server.

Figure 11:
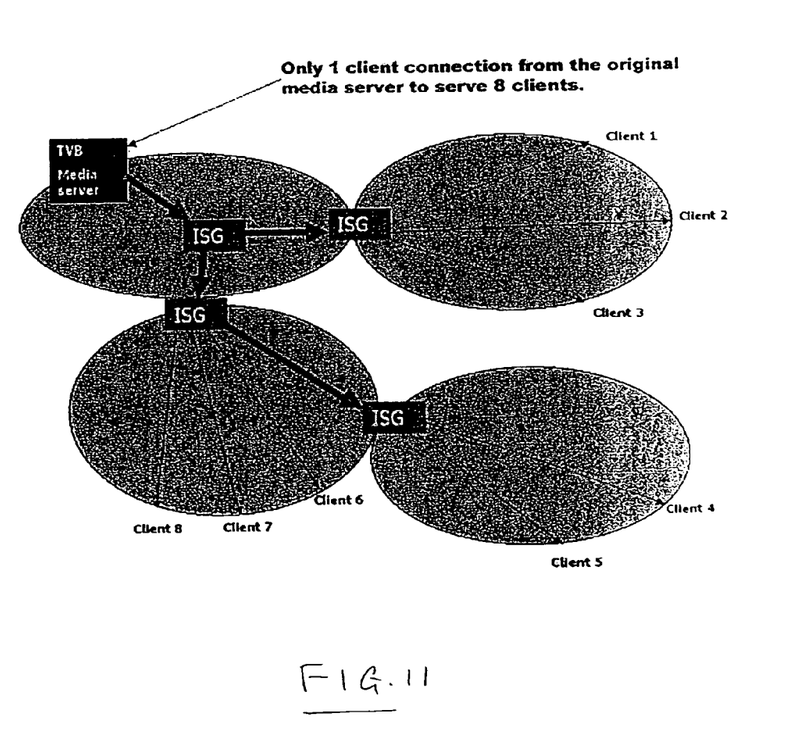
FIG. 11 shows a first example of a network of gateways.
Figure 12:
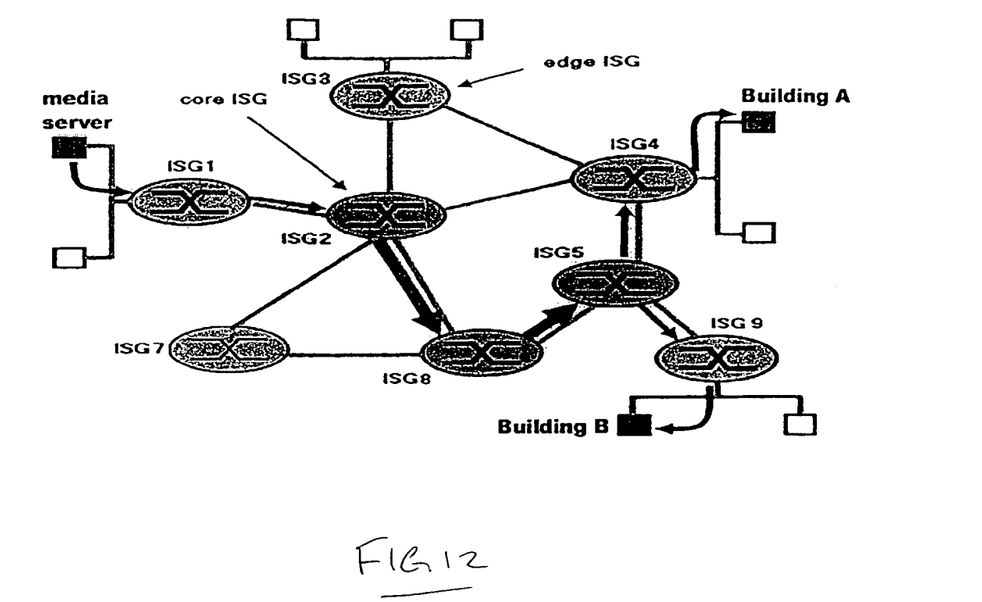
FIG. 12 shows a second example of a network of gateways.

FIG. 11 shows a simple example of how this embodiment can work. In this example, there is one server, four ISGs and eight clients. There is only one stream from the server which goes to a first ISG. That first ISG serves no clients of its own but supplies the streaming content to second and third ISGs. The second and third ISGs both serve three clients of their own, while the third ISG also serves a fourth ISG that has two clients. This embodiment allows a distributed load-balanced duplication of a single streaming content. FIG. 12 shows another example of this embodiment in which multiple ISGs form a content delivery network. In the example of FIG. 12 the media server can supply streaming content to both Buildings A and B in the most effective manner with only one streaming content being transmitted by the media server itself.

A further advantage of the present invention is that it also permits high-performance streaming of data over multiple domains where some domains permit multicast and others do not. As has been explained previously, in principle multicast technology, while in principle very desirable for a number of applications, has practical difficulties because not every network domain permits multicast transmission and a conventional multicast transmission will effectively be blocked when it comes across such a unicast-only domain.

Figure 13:
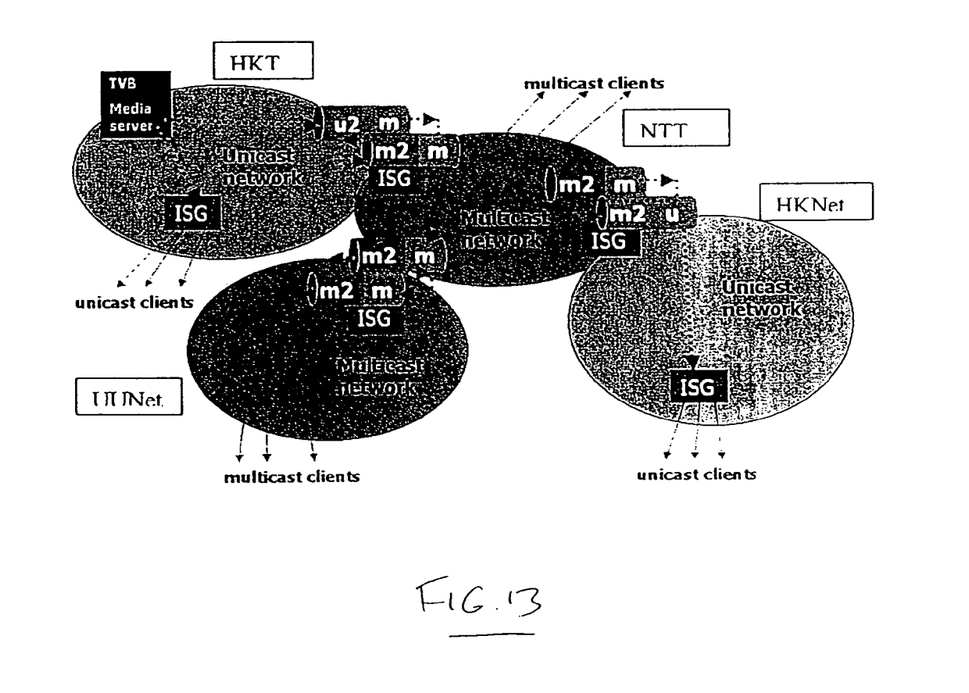
FIG. 13 illustrates how the present invention can be used to facilitate streaming across unicast and mulitcast domains.

By means of an embodiment of the present invention, streaming across unicast and multicast domains is possible because the ISGs located at the boundaries of the different domains can be set such that the APIs within the ISGs convert the packet types from unicast to multicast and vice versa using u-to-m and m-to-u APIs where appropriate. This is shown in FIG. 13 in which streaming content is transmitted through a network of ISGs that extends across both unicast and multicast network domains. At the boundary between a unicast and a multicast network a u-to-m API is used to change the data packets from unicast to multicast, while at the boundary between a multicast domain network and a unicast domain network a m-to-u API is used to change the data packets from multicast to unicast. No change is required of course at the boundary of two unicast or two multicast domains, in general, but a multicast address of one multicast group can be changed to a multicast address of another group if desired.

The invention claimed is:

1. Apparatus for providing streaming data from a server to multiple clients comprising, a gateway located between said server and said clients, wherein said gateway includes:
    (a) means for obtaining streaming data from said server upon receipt of a first request for a stream from any of said clients, and
    (b) means responsive to second and subsequent clients requesting said stream for effectively duplicating said stream within said gateway by converting a unicast address type to a multicast address type to provide said stream to said second and subsequent clients from said gateway.

2. Apparatus as claimed in claim 1 wherein said gateway comprises means for maintaining a list of all streams currently being supplied to clients of said gateway, and means for comparing a request from a client for a stream with said list, said stream being obtained from said server if the requested stream is not on said list and said stream being effectively duplicated and supplied to the client from the gateway if the requested stream is on said list.

3. Apparatus as claimed in claim 2 wherein said duplicating means in said gateway includes software interface means for changing the address type of the data packets of a said stream, whereby when it is desired to supply a stream to a client, the data packets input to said gateway are switched to a multicast address type for supply to all said clients requesting said stream.

4. Apparatus as claimed in claim 3 wherein means are provided within said gateway for duplicating said data packets to be supplied to multiple clients by providing a logical multicast loop back, and wherein the time-to-live (TTL) is set to zero.

5. Apparatus as claimed in claim 4 wherein after duplication of said data packets, a second software interface changes the address type of said duplicated data packets from multicast back to unicast prior to output to said clients.

6. Apparatus as claimed in claim 4 wherein after duplication of said data packets, a second software interface changes the address type of said duplicated data packets to a second multicast address prior to output to said clients, wherein said second multicast address corresponds to said clients who are a group within a multicast enabled network.

7. Apparatus for providing streaming data from a server to multiple clients, comprising a plurality of gateways located between said server and said clients, each said client being associated with one said gateway, wherein each said gateway is provided with means for sourcing a data stream from a server or another gateway upon receipt of a first request for a said stream, and means for supplying a second or subsequent client with a data stream, and wherein each said gateway is provided with means for deciding upon receipt of a request from a client for a data stream whether said gateway can supply the data stream itself and, if not, for deciding whether a neighbouring gateway exists from which said data stream may be obtained, and means for selecting between two or more possible gateways as the source of data stream requested by a client, wherein said selecting means selects from said possible source gateways by one or more of the following factors: (a) eliminating possible sources that are at or beyond a maximum loading, (b) on the basis of quality of said streams supplied by said possible source gateways, (c) the loading of said possible source gateways, and (d) the communication latency between said possible source gateways and said requesting gateway.

8. Apparatus as claimed in claim 7 wherein each said gateway includes: a list of all neighbouring gateways, a database listing all the data streams currently being supplied by said neighbouring gateways, and a database of all the streams being supplied by the said gateway.

9. Apparatus as claimed in claim 8 wherein each said gateway reports to each neighbouring said gateway when it starts to supply a new data stream.

10. Apparatus as claimed in claim 7 wherein each said gateway is provided with means for interrogating a possible source gateway as to said loading, stream quality, and communication latency.

11. Apparatus as claimed in claim 10 wherein after overloaded or maximum loaded possible sources have been eliminated, the quality of the streams provided by the possible source gateways is the first criteria in selecting a source gateway, the source gateway loading is the second criteria to be used in the event of equal stream quality, and the communication latency is the final criteria if stream quality and source gateway loading are all equal.

12. A method of providing streaming data from a server to multiple clients comprising, locating a gateway between said server and said clients, obtaining streaming data from said server upon receipt of a first request for a stream from any of said clients, and effectively duplicating said streaming data by converting a unicast address type to a multicast address type in response to requests from second and subsequent clients to provide said stream from said gateway to said second and subsequent clients.

13. A method as claimed in claim 12 comprising means for maintaining in said gateway a list of all streams currently being supplied to clients of said gateway, and comparing a request from a client for a stream with said list, and obtaining a requested stream from said server if the requested stream is not on said list and supplying said requested stream to the client from the gateway if the requested stream is on said list.

14. A method as claimed in claim 13 wherein when a stream already being supplied to a first client is to be supplied to a second or subsequent client, the stream is effectively duplicated by switching data packet address types of the data packets comprising said stream to multicast address type for supply to all clients requesting said stream.

15. A method as claimed in claim 14 comprising duplicating said data packets within said gateway by logical multicast looping back and setting the time-to-live to zero.

16. A method as claimed in claim 15 comprising switching the data packet address types of said duplicated data packets to unicast and outputting said duplicated streams to said clients.

17. A method as claimed in claim 15 wherein after duplication the data packet address types of said duplicated data packets are changed to a multicast address corresponding to clients wishing to receive said stream, said clients being a group within a multicast enabled network.

18. A method for providing streaming data from a server to multiple clients, comprising locating a plurality of gateways between said server and said clients, each said client being associated with one said gateway, sourcing a data stream from a server or another gateway in the event that a request for a stream is a first request to a said gateway for a said stream, supplying a data stream from the said gateway to a second or subsequent client requesting a data stream, deciding whether a neighbouring gateway exists from which a first requested data stream may be obtained, selecting between two or more gateways that are possible sources of a requested data stream by interrogating said possible sources about the loading of the possible source gateways, quality of the data stream and the communication latency between the gateway and the possible source gateways.

19. A method as claimed in claim 18 wherein when a gateway starts to serve a data stream for the first time, said gateway reports to all neighbouring gateways that it is serving this said data stream.

20. A method as claimed in claim 18 wherein the selection of a source gateway is made by eliminating overloaded or maximum loaded possible source gateways and then on the basis of the stream quality, secondly on the basis of source loading in the event that stream quality is the same, and lastly on the basis of communication latency in the event that stream quality and loading are the same.

* * * * *